US007286723B2

(12) United States Patent
Taugher et al.

(10) Patent No.: US 7,286,723 B2
(45) Date of Patent: Oct. 23, 2007

(54) SYSTEM AND METHOD FOR ORGANIZING IMAGES

(75) Inventors: Lawrence Nathaniel Taugher, Loveland, CO (US); Paul William Martin, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 10/608,180

(22) Filed: Jun. 27, 2003

(65) Prior Publication Data

US 2004/0264810 A1   Dec. 30, 2004

(51) Int. Cl.
*G06K 9/60* (2006.01)
*G06F 7/00* (2006.01)

(52) U.S. Cl. .............. 382/305; 382/306; 382/307; 707/7; 707/102

(58) Field of Classification Search ........ 382/305–307; 707/7, 102
See application file for complete search history.

(56) References Cited

U.S. PATENT DOCUMENTS 5,784,461 A * 7/1998 Shaffer et al. ............... 705/51
6,035,323 A * 3/2000 Narayen et al. ............ 709/201
6,389,181 B2 * 5/2002 Shaffer et al. .............. 382/305

* cited by examiner

*Primary Examiner*—Matthew C. Bella
*Assistant Examiner*—Wes Tucker

(57) ABSTRACT

Disclosed are systems and methods for organizing images. In one embodiment, a system and a method pertain to analyzing images, detecting attributes of the images, comparing the detected attributes to identify images having a similar attribute, and associating images having the similar attribute to automatically generate an attribute-based album.

13 Claims, 10 Drawing Sheets

600

| DAY | NO. OF IMAGES |
|---|---|
| 105 | 1 |
| 106 | 0 |
| 107 | 0 |
| 108 | 22 |
| 109 | 15 |
| 110 | 18 |
| 111 | 0 |
| 112 | 1 |
| 113 | 3 |
| 114 | 2 |

SYSTEM AND METHOD FOR ORGANIZING IMAGES

BACKGROUND

Computer users often store digital images, for instance images that the user has captured with an image capture device such as a digital camera, electronically on their computers. Typically, such images are stored in folders under a date identifier indicating when the images were downloaded, or under a user-provided name. Images within the folders usually have numerical file names such as "001," "002," and so forth.

Under such an organization scheme, it can be difficult for users to find images that the user wishes to locate, for instance to share an image with another (e.g., via email) or to create onscreen slide shows. To locate such an image, the user must either remember when the particular image was downloaded to the computer, or manually search through multiple folders using an appropriate browsing program that displays thumbnails of the stored images until the image is found.

Users can simplify the image location process by diligently managing their stored images. For instance, a user can change the locations at which images are stored by moving images from the folder in which they were originally placed to another folder having a descriptive title such as "family," "friends," "business," and "vacation." In such a case, the user can narrow his or her field of search for an image. This organization method is disadvantageous for several reasons. First, the user must spend a large amount of time moving images to the correct folders each time new images are downloaded. This process can be tedious, particularly in situations in which the user downloads images frequently. Furthermore, a given image may be relevant to more than one folder. For instance, if an image contains both family members and friends, the image may be suitable for both a "family" folder and a "friends" folder. In such a case, the user may store copies of the image in multiple folders, so as not to risk being unable to locate the images easily at a later date, thereby adding to the tedium involved in the organization process. Storing multiple copies of images in this manner also wastes disk space, especially when the images are high resolution images and, therefore, large files.

Even when the user takes the time to carefully organize his or her images on the computer, the user must still manually scroll through thumbnail images contained in the various folders to locate images. This process can also be tedious and slow. Furthermore, in that the thumbnail images have low resolution and are small, it is easy for the user to pass over a desired image without recognizing it.

Therefore, it can be appreciated that it would be desirable to automate the image organization process to simplify the process.

SUMMARY OF THE DISCLOSURE

Disclosed are systems and methods for organizing digital images. In one embodiment, a system and a method pertain to analyzing images, detecting attributes of the images, comparing the detected attributes to identify images having a similar attribute, and associating images having the similar attribute to automatically generate an attribute-based album.

BRIEF DESCRIPTION OF THE DRAWINGS

The disclosed systems and methods can be better understood with reference to the following drawings. The components in the drawings are not necessarily to scale.

FIG. 6 illustrates an embodiment of a table that identifies the number of images taken on given days to facilitate image organization.

DETAILED DESCRIPTION

As noted above, current methods for organizing images have attendant drawbacks. As is described in the present disclosure, however, such drawbacks can be avoided or reduced by automating the image organization process for the user. In particular, advantageous results can be obtained by automatically storing the images in date-based albums that comprise images downloaded on a given date, and furthermore automatically generating albums that comprise images that share common attributes. Once such attribute-based albums are created, the user can more easily locate desired images as well as view image slide shows that are better organized than simply by the date on which they were downloaded.

Disclosed herein are embodiments of systems and methods that facilitate images organization. Although particular embodiments are disclosed, these embodiments are provided for purposes of example only to facilitate description of the disclosed systems and methods. Accordingly, other embodiments are possible.

Figure 1:
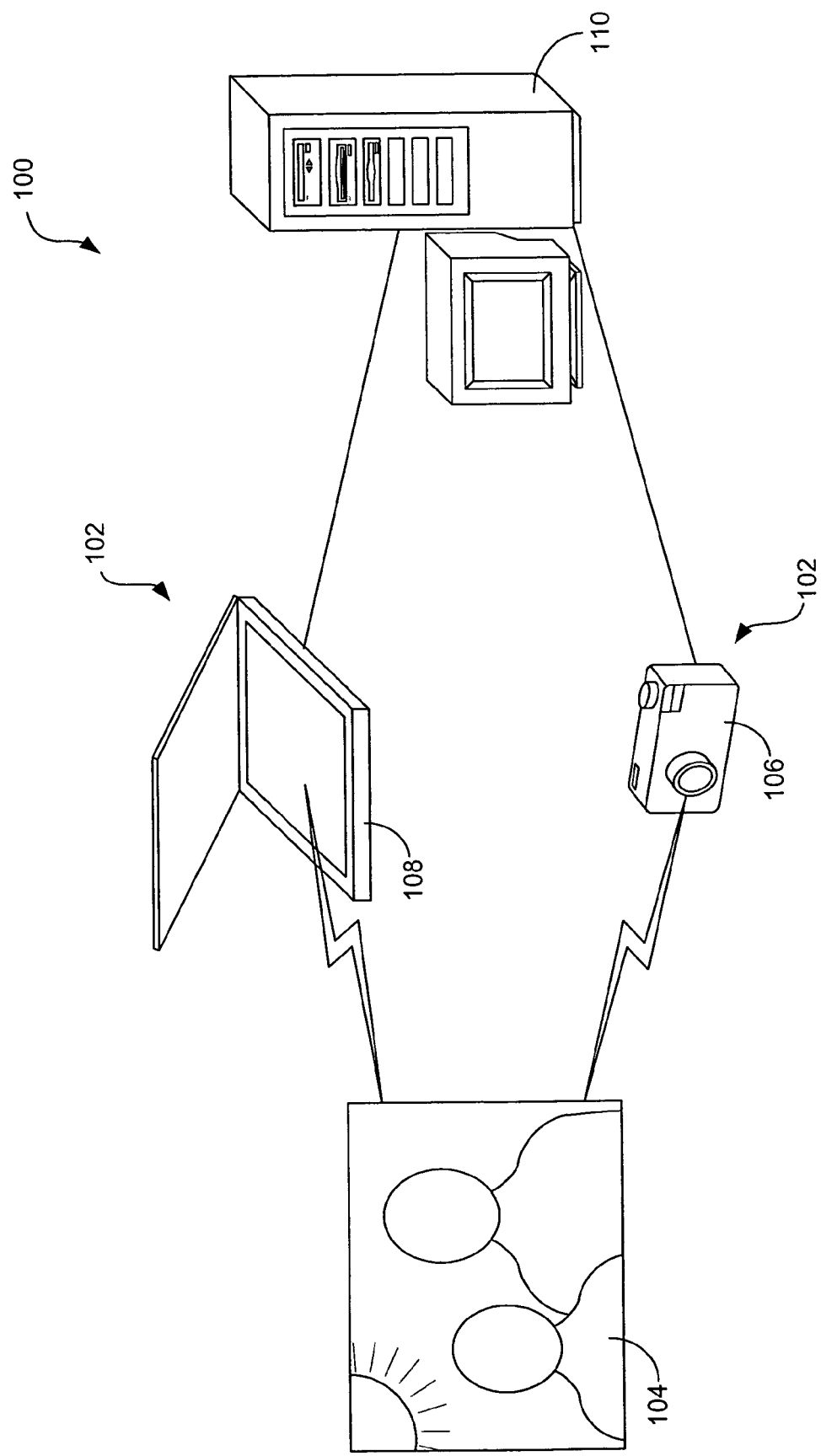
FIG. 1 is a schematic view of an embodiment of a system with which images can be automatically organized.

Referring now to the drawings, in which like numerals indicate corresponding parts throughout the several views, FIG. 1 illustrates a system 100 that is configured to download and organize images. As indicated in this figure, the example system 100 comprises one or more image capture devices 102 that are used to capture an image 104 that is either an actual, real time scene or an existing hardcopy photograph. The nature of the image capture device 102 used depends upon the image capture situation. By way of example, the image capture devices 102 comprise one or more of a digital camera 106 and a scanner 108. Although these particular image capture devices are illustrated in FIG. 1 and are specifically identified herein, substantially any image capture device may be used to obtain digital images that can be organized by the system 100. Moreover, although it is presumed that the user captured the images, images may be obtained through other means such as, for instance, download from the Internet.

As is further indicated in FIG. 1, each of the image capture devices 102 can be placed in communication with a computing device 110 for purposes of storing the captured images. Such communications can be supported by a direct wired (e.g., universal serial bus (USB)) or wireless (e.g., infrared (IR) or radio frequency (RF)) connection, or an indirect wired or wireless connection (e.g., network connection). As is depicted in FIG. 1, the computing device 110 can be a personal computer (PC). More generally, however, the computing device 110 comprises any device that can receive images and organize them in accordance with the processes described herein. Therefore, the computing device 110 could, alternatively, comprise, for example, a MacIntosh™ computer, notebook computer, or handheld computing device such as a personal digital assistant (PDA).

Figure 2:
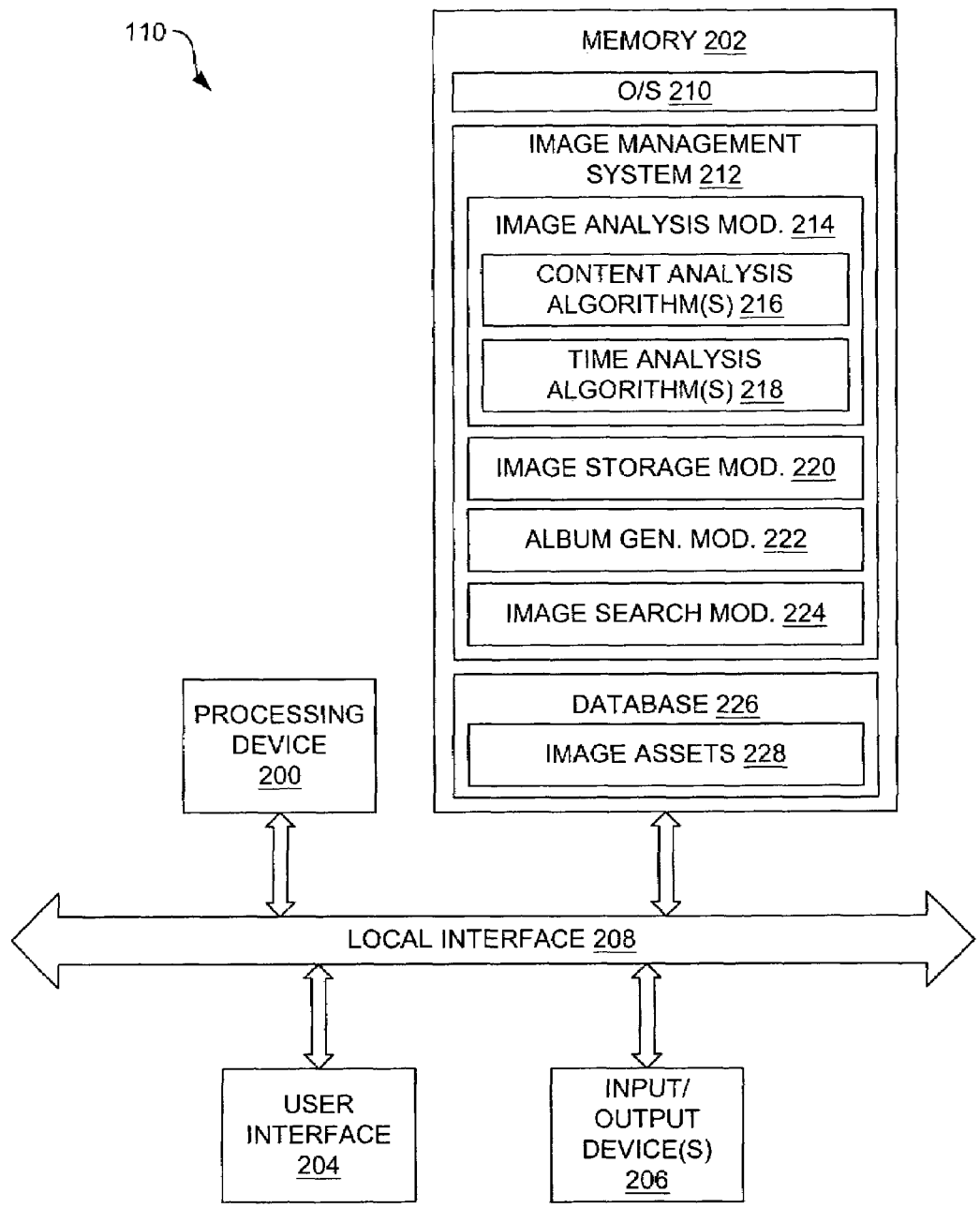
FIG. 2 is a block diagram of an embodiment of a computing device shown in FIG. 1.

FIG. 2 is a block diagram illustrating an example architecture for the computing device 110 shown in FIG. 1. As indicated in FIG. 2, the computing device 110 comprises a processing device 200, memory 202, a user interface 204, and at least one input/output (I/O) device 206, each of which is connected to a local interface 208.

The processing device 200 can include a central processing unit (CPU) or an auxiliary processor among several processors associated with the computing device 110. The memory 202 includes any one of or a combination of volatile memory elements (e.g., RAM) and nonvolatile memory elements (e.g., read only memory (ROM), hard disk, tape, etc.).

The user interface 204 comprises the components with which a user interacts with the computing device 110, such as a keyboard and mouse, and a device that provides visual information to the user, such as a cathode ray tube (CRT) or liquid crystal display (LCD) monitor.

With further reference to FIG. 2, the one or more I/O devices 206 are configured to facilitate communications with the image capture devices 102 and may include one or more communication components such as a modulator/demodulator (e.g., modem), USB connector, wireless (e.g., (RF)) transceiver, a telephonic interface, a bridge, a router, etc.

The memory 202 comprises various programs, in software and/or firmware, including an operating system 210 and an image management system 212 that, at least in part, automates the image organization process. The operating system 210 controls the execution of other software and provides scheduling, input-output control, file and data management, memory management, and communication control and related services.

In the embodiment shown in FIG. 2, the image management system 212 comprises various different components or modules. These modules include an image analysis module 214 that evaluates images to identify their attributes. Such attributes include content attributes detected by one or more content analysis algorithms 216, and time attributes detected by one or more time analysis algorithms 218. With these components, the image analysis module 214 can categorize images according to the subject matter that they comprise and/or the time at which they were captured or otherwise obtained.

The image management system 212 further includes an image storage module 220 that is responsible for storing downloaded images within appropriate groups within computing device memory 202. As is described in greater detail below, these groups include protected originals folders, date-based albums, and attribute-based albums that associate images having common attributes. These groups comprise part of a larger database 226 stored in computing device memory 202. Notably, the memory that comprises the database 226 can, for instance, comprise a permanent storage component, such as a hard disk. In addition, the image management system 212 comprises an album generation module 222 that automatically creates the attribute-based albums. Lastly, the image management system 212 includes an image search module 224 that may be used to locate desired images. Operation of the image management system 212 is described below with reference to FIGS. 3-7.

In addition to these components, the memory 202 may comprise image assets 228, for example stored in the database 226, that may be associated with images. Such assets 228 comprise visual and/or audio features.

Various programs have been described above. These programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, operation of the systems will now be discussed. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 3A:
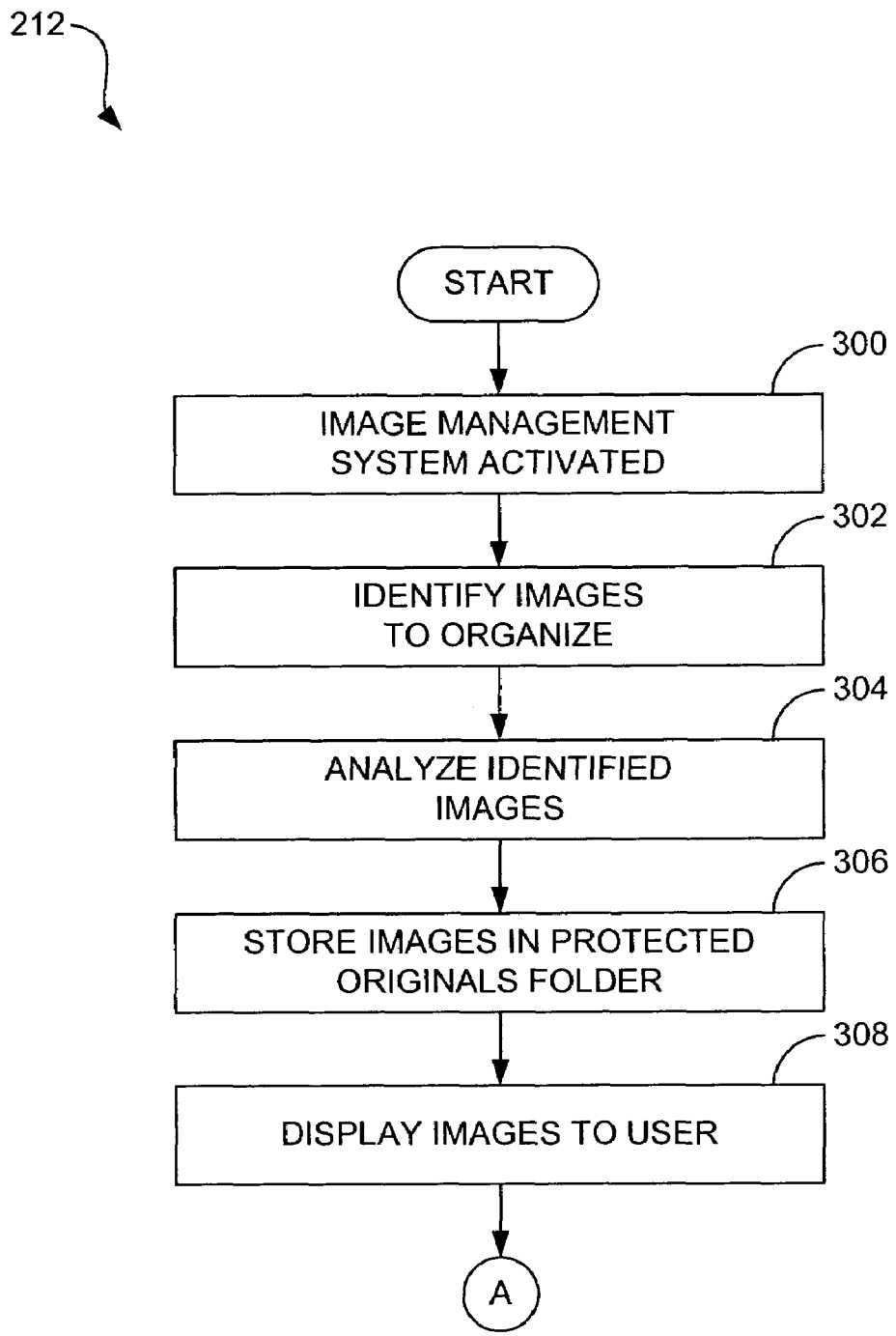
FIGS. 3A-3C comprise a flow diagram that illustrates an embodiment of a method for organizing images.
Figure 3B:
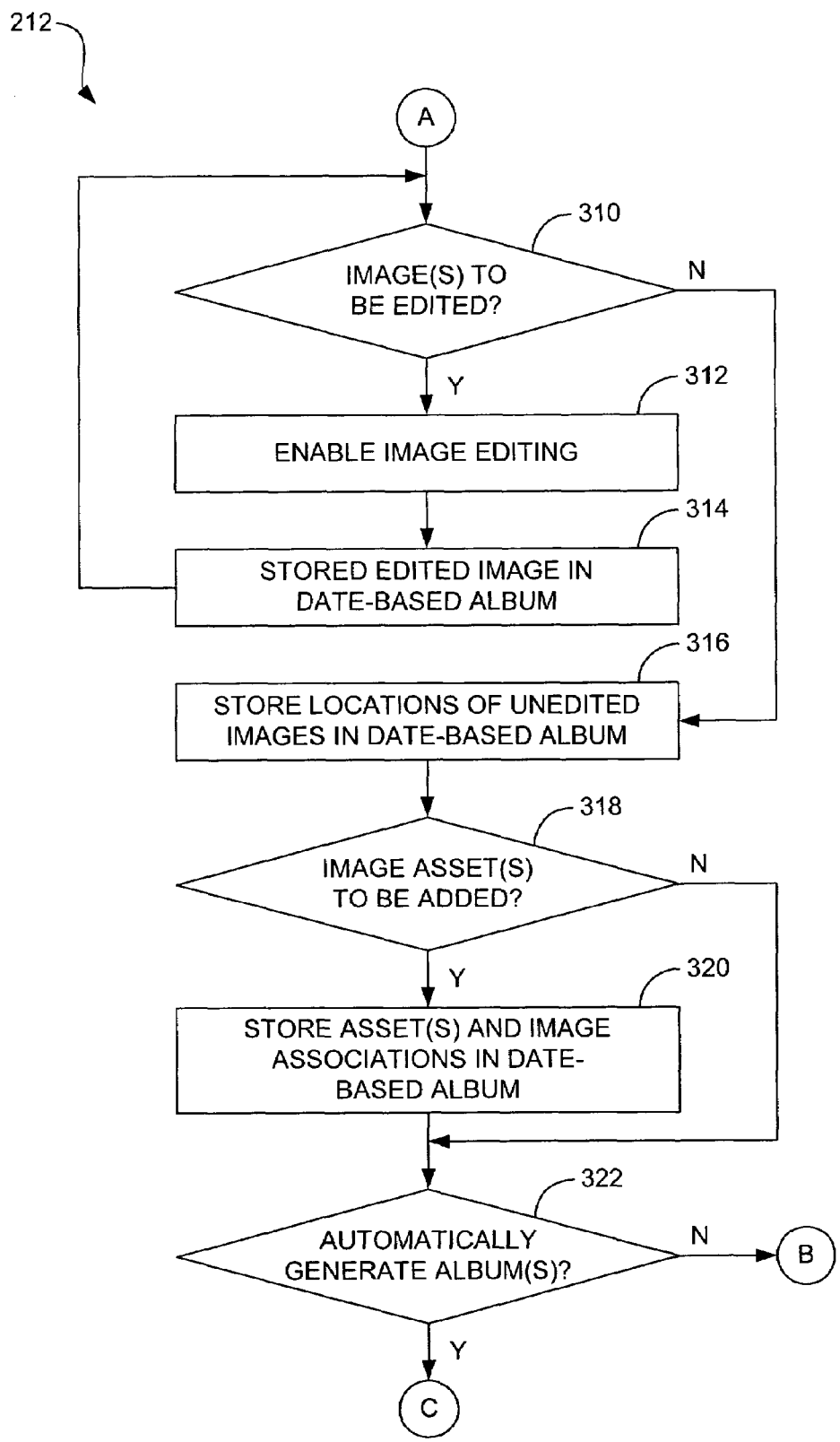
Figure 3C:
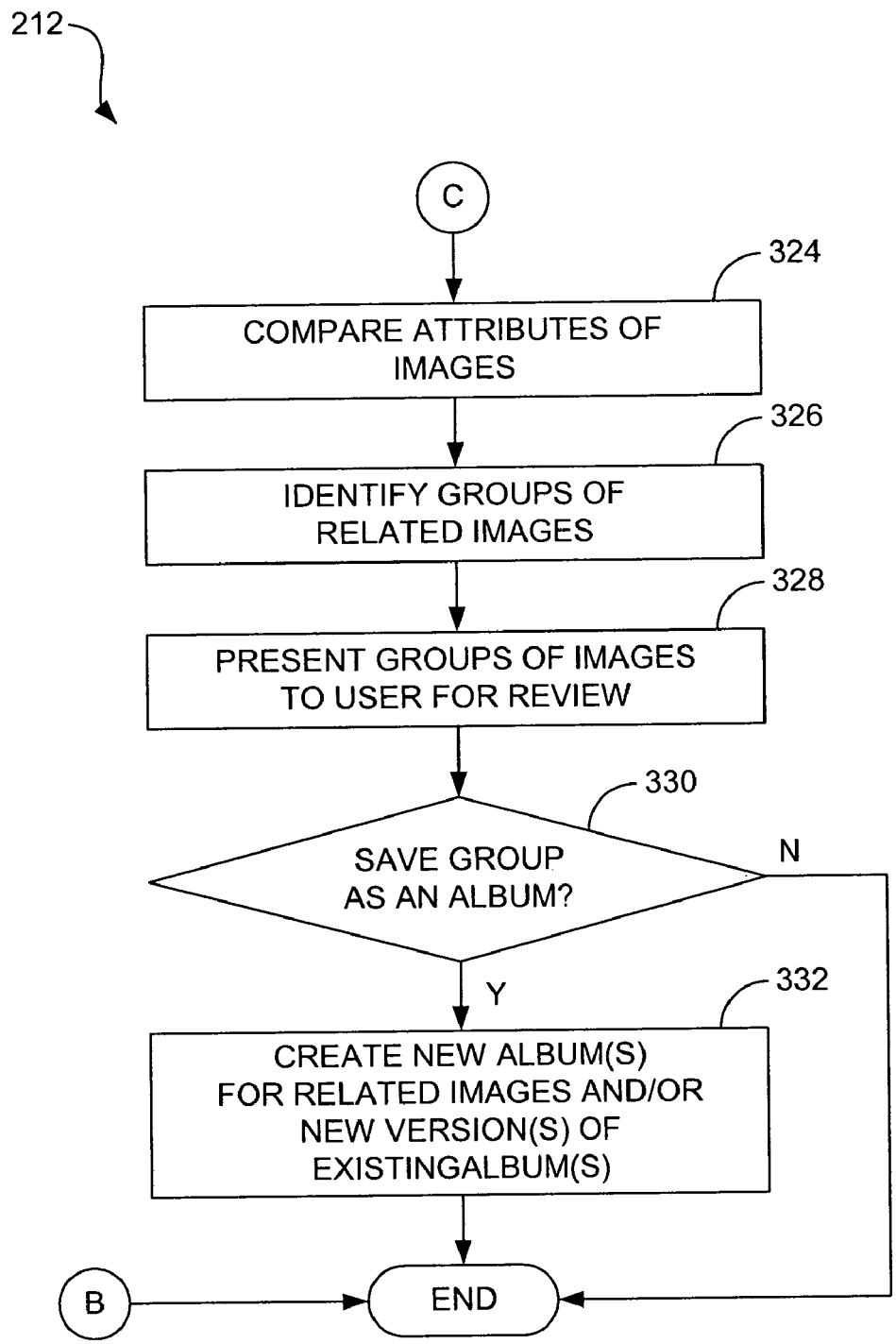

FIGS. 3A-3C describe an embodiment of a method for organizing downloaded images using the image management system 212. Such organizing may occur during download of images from an image capture device as well as download of images from another source, such as the Internet. Furthermore, previously-downloaded images may be organized when designated for inclusion in the organization process by the user. Beginning with block 300 of FIG. 3A, the image management system 212 is activated. This activation may occur, for example, in response to images captured with an image capture device and/or obtained from the Internet being downloaded. Alternatively, activation may occur upon user initiation.

Figure 4A:
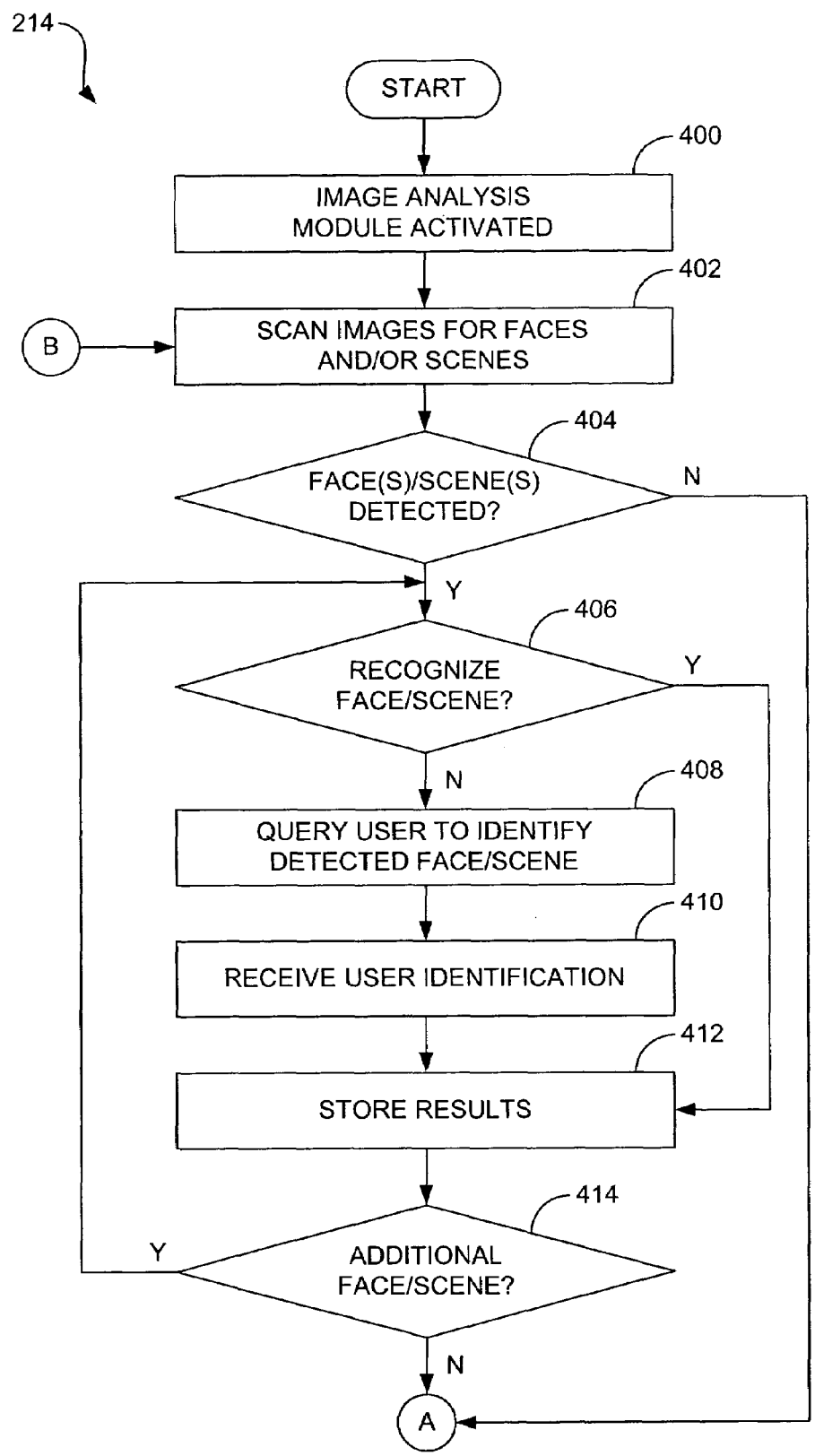
FIGS. 4A and 4B comprise a flow diagram that illustrates an embodiment of a method for analyzing images in the method of FIGS. 3A-3C.
Figure 4B:
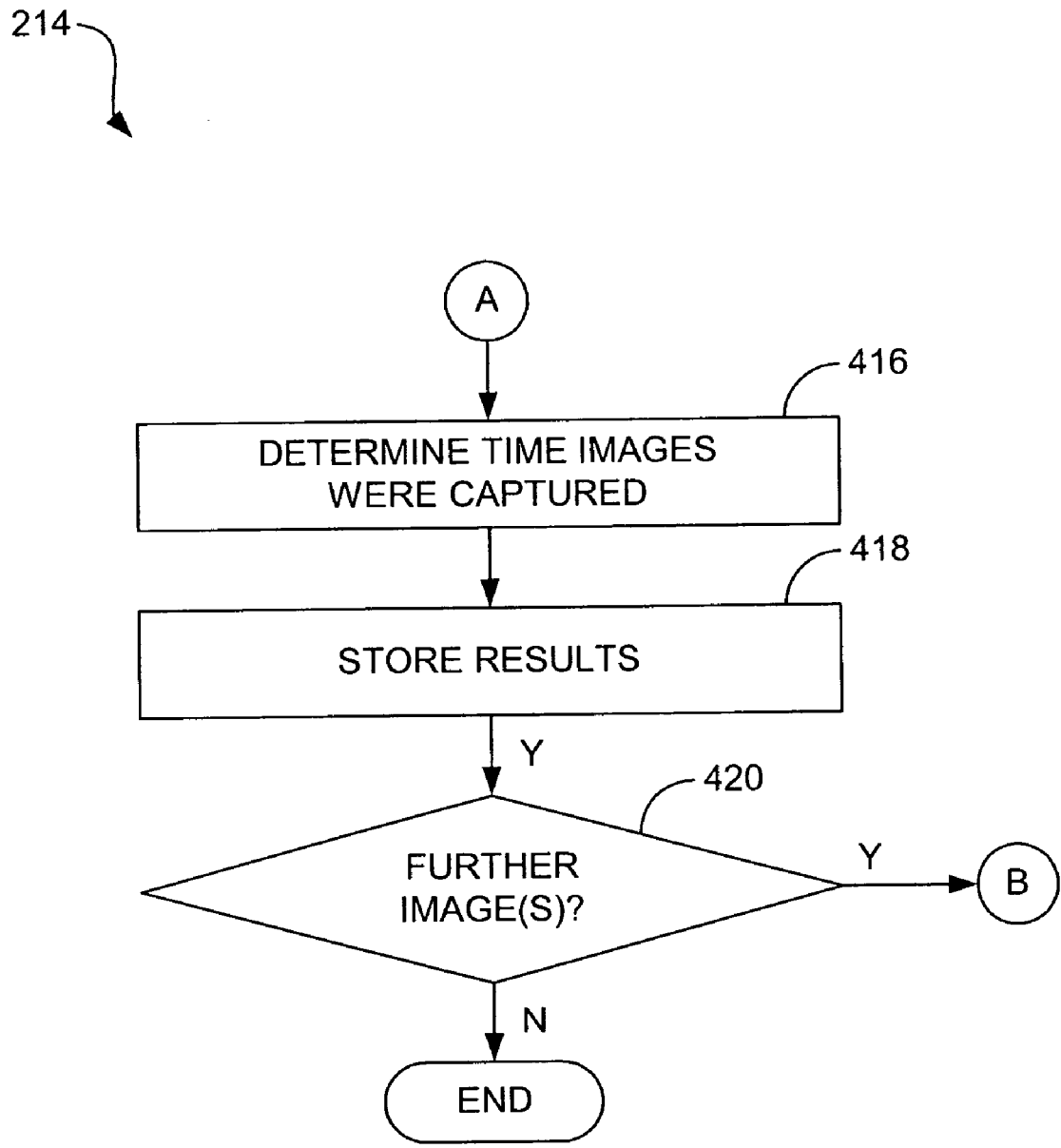

In any case, once the image management system 212 is activated it identifies the images that are to be organized, as indicated in block 302. Next, with reference to block 304, the identified images are analyzed. This analysis can take many different forms. Generally speaking, however, the analysis comprises evaluating the content of the images as well as the time the images were captured or otherwise obtained. FIGS. 4A and 4B provide an embodiment of a method for analyzing images that may be practiced with respect to block 304. Beginning with block 400 of FIG. 4A, the image analysis module 214 of the image management system 212 is activated and, with reference to block 402, the images are scanned by the module to identify the faces and/or scenes that they contain. During this scanning, the content of the images is evaluated through use of one or more content analysis algorithms 216. One such algorithm 216 is used to identify the visual characteristics that pertain to faces. Therefore, the algorithm 216 is configured to search for generally oval areas occupied by skin tones and discrete facial features such as eyes, noses, mouths, etc.

Another algorithm 216, or the same algorithm, is used to detect the scenes comprised by the images. This detection is performed by searching for specific scenic features such as particular buildings, outdoor environments, indoor settings, etc. Optionally, generic scenic features such as sky, bodies of water, indoor lighting, etc. may also be detected for purposes of organizing images.

With reference to decision block 404, if no such identifiable faces or scenes are detected, flow continues down to block 416 of FIG. 4B. If, on the other hand, one or more faces and/or scenes are detected, flow continues to decision block 406 at which the image analysis module 214 determines, as to each detected face and/or scene, whether the face or scene is recognized as a known face or scene. In terms of detected faces, the image analysis module 214 compares the detected faces to face data that was previously collected and stored (e.g., in the database 226) during previous image analysis. Therefore, the module 214 attempts to match detected faces with those previously identified. As is described below (blocks 408-410), identification information as to these faces may be provided by the user to identify the persons having the detected faces. In such a case, the stored face data can comprise names associated with the detected faces.

In terms of scenes, the image analysis module 214 compares the detected scenic features to stored scene data that was either included collected and stored (e.g., in the database 226) during image analysis or included as "stock" scene data as part of the image management system 212. In the latter case, the stock scene data may comprise famous natural features (e.g., Grand Canyon) and man-made structures (e.g., the White House) so that images containing such features or structures can be identified as pertaining to known locations. Therefore, if, for example, an image comprises the Eiffel Tower in the background, the module 214 can determine that the image was captured in Paris, France. Notably, the scene data may also comprise identification information provided by the user. For instance, the user may have previously identified a building in an image as his or her house.

If a face or scene is recognized, flow continues to block 412 described below. If not, however, flow continues to block 408 at which the user is queried as to the detected face or scene. Optionally, the module 214 may only query users as to specific, recurring faces or scenes. Such a feature is useful for situations in which images are captured as to large groups of persons that are not significant to the user (e.g., images of a friend in a crowd of strangers), and to avoid querying the user as to a multiplicity of scenic features (e.g., buildings in a cityscape image) contained in his or her images. Through this query, the user can, optionally, be presented with a menu or list of face and scene identities that were previously identified by the user or that were preprogrammed into the module 214. In such a case, the user can, for example, select the name of a person when that person's face has been identified.

If the identity of the person or the scene is not contained in a list provided to the user, the user can provide the identification information for that person or scene in an appropriate data field. Provision of such identification information facilitates later searching of the user's images (see FIG. 7). Assuming the user responded to the query by providing identification information, this information is received by the module 214, as indicated in block 410, and the results of the content analysis at this stage are stored, as indicated in block 412.

Next, flow continues to decision block 414 at which it is determined whether one or more detected faces or scenes are to be evaluated for recognition. If so, flow returns to decision block 406 and proceeds from that point in the manner described above. If not, however, flow continues to block 416 of FIG. 4B for the next stage of the image analysis.

Referring now to block 416 of FIG. 4B, the times at which the images were captured or otherwise obtained are determined by the time analysis algorithm 218. This time includes the date as well as the time of day (when available) that the image was captured or obtained. If the capture time is to be detected, it may be obtained by reading header data stored along with each image. Once the various times at which the images were captured or otherwise obtained have been determined, this data is stored, as indicated in block 418. At this point, flow continues to decision block 420 at which it is determined whether there are further images to analyze. If so, flow returns to block 402 of FIG. 4A, and the process continues in the manner described above. If not, however, flow for the analysis session is terminated.

Figure 5:
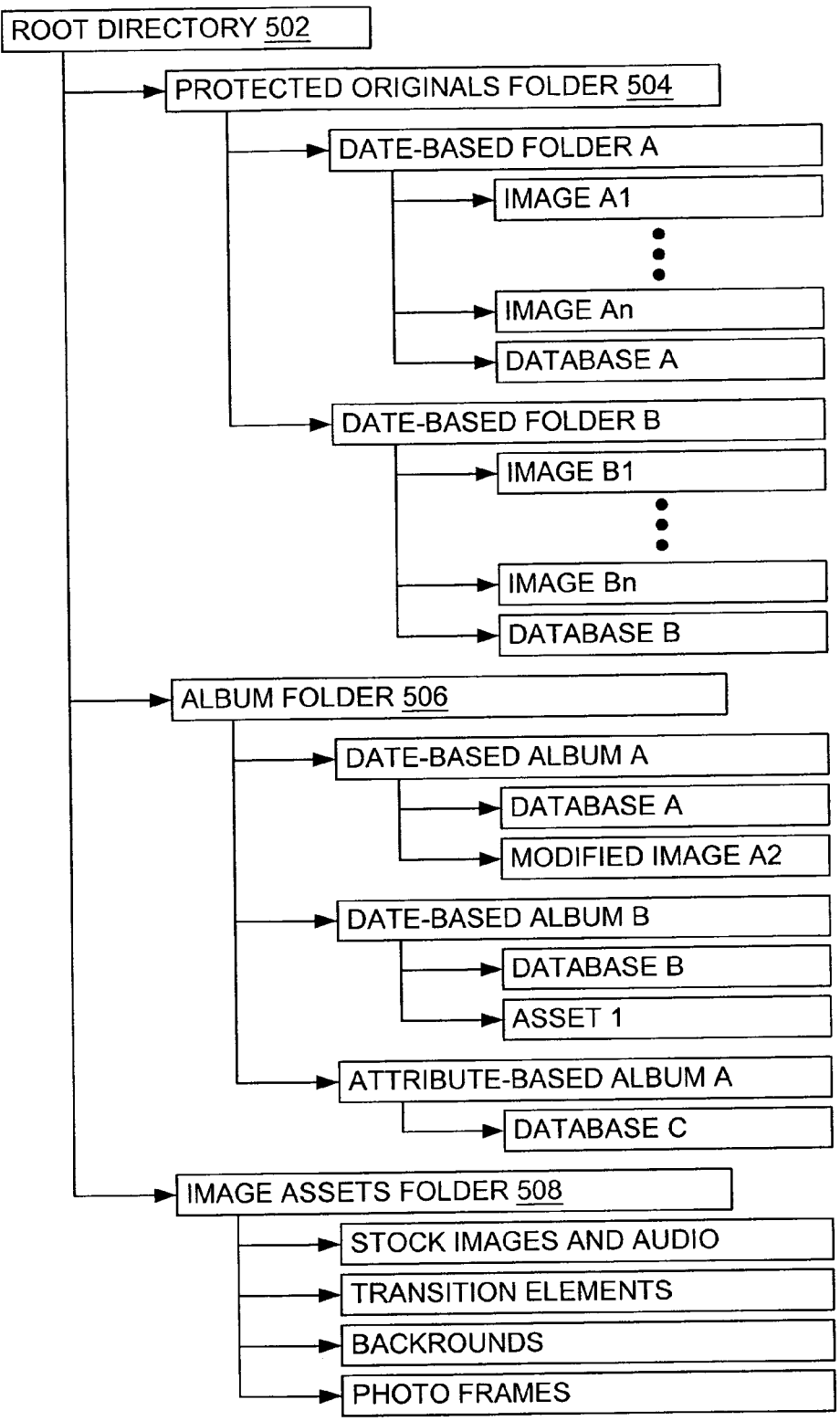
FIG. 5 illustrates an embodiment of a file structure that can be used to organize images.

Returning now to FIG. 3, the images are stored in a protected originals folder, as indicated in block 306, by the image storage module 220. Although such storage is described as being performed after analyzing the images, the images could instead be stored in the protected originals folder and then analyzed, if desired. The protected originals folder stores the images in their original state and protects them such that they can neither be deleted (or only deleted after multiple confirmations by the user) nor modified by the user. Therefore, the protected originals folder acts as a repository for images that are treated as film negatives. An example file structure 500 containing a protected originals folder is shown in FIG. 5. As illustrated in this figure, the protected originals folder 504 is contained within a root directory 502 of the file structure 500 and comprises one or more date-based subfolders that contain images that were downloaded on a particular date. In the example of FIG. 5, the protected originals folder 504 comprises two such subfolders: a date-based folder "A" and a date-based folder "B." As is indicated in FIG. 5, each subfolder includes images 1-n. In addition, each subfolder comprises a database (database "A" and database "B" in FIG. 5) that contains the results of the analysis performed in block 304. By way of example, each database comprises one or more extensible markup language (XML) files that contain this information.

Once the images have been stored in the protected originals folder, or at some time previous to such storage, the images are displayed to the user, as indicated in block 308. Such display provides the user with an opportunity to review the images and, if desired, modify them in some way. One form of modification comprises editing such as adjusting the image balance (e.g., brightness and contrast), cropping, rotating, sharpening, etc. Such editing can be performed through use of a separate image editing program (not shown), or by using the image management system 212 if provided with such a utility. With reference to decision block 310 of FIG. 3B, if no such editing is desired, flow continues to block 316 described below. If editing is desired, however, the image management system 212 enables this editing, as indicated in block 312, and the edited, i.e., modified, image is stored in a date-based album, as indicated in block 314. An example location of such an album is illustrated in FIG. 5. As indicated in this figure, date-based albums are stored within an album folder 506. In the example of FIG. 5, two such data-based albums, a date-based album "A" and a date-based album "B," are provided.

At this point, flow returns to decision block 310 to determine whether any other images are to be edited. If no, or no more, edits are to be made, flow continues next to block 316 at which the locations of the original images, which were not edited by the user, are stored in a date-based album. Each date-based album contains a database in which the image location information is contained. These databases therefore comprise pointers to the original images within the protected originals folder 504 and any modified images within the album. The albums therefore represent groupings of images downloaded on a given date that may be viewed (e.g., in a slide show format) by the user. In that modified images are stored within the albums, these modified images are viewed in lieu of the originals when images of the album are viewed. Due to this separate storage, the original images are not lost even if the images were edited by the user. Moreover, in that that unedited images are not actually stored within the albums, storage of multiple copies of identical images is avoided.

Referring next to decision element 318 of FIG. 3B, it is determined whether image assets are to be added to one or more images. As indicated in the file structure 500 of FIG. 5, such image assets may be contained in an image assets folder 508 comprising various add-on features such as stock images and audio, image transition elements, backgrounds, photo frames, etc. Therefore, the assets comprise features that can be added to individual images, or between images when the images are viewed as a slide show. If no such assets are to be added, flow continues down to decision block 322 described below. If one or more assets are to be added, however, flow continues to block 320 at which an association between the asset and the image or images it affects is stored in the pertinent date-based album (FIG. 5). Accordingly, an appropriate pointer to the asset and a file (e.g., XML file) that identifies how the asset is to be used is stored in the data-based album. Accordingly, when the images are viewed (e.g., in a slide show), the asset(s) will be added to the appropriate image(s).

With reference to decision block 322, it is next determined whether to automatically generate attribute-based albums that contain images having common attributes other than the fact that they were downloaded on the same date. Whether such albums are generated may be left to the discretion of the user. In such a case, the user is prompted to authorize such album generation. If the user does not wish such albums to be created at that time, flow for the organization session is terminated (FIG. 3C) and the user is free to view the date-based albums, including the modified images with and any appurtenant assets.

If albums are to be automatically generated, flow continues to block 324 of FIG. 3C at which the album generation module 222 of the image management system 212 compares the attributes of all stored images to determine which images should be associated in which album. When a file structure such as that shown in FIG. 5 is used, the image attributes considered comprise those stored in the databases of the protected originals folder 504. Specifically, the system compares image attributes of the various date-based folder databases. Accordingly, the image management system 212 compares the attributes of the original images without any modification by the user.

Through this comparison, groups of related images are identified as indicated in block 326. The relationships between the images can take many different forms. In one sense, the images may be grouped according to their content. Accordingly, the images of a given group may, for instance, comprise images containing a given face or group (e.g., pair) of faces. To cite another example, images containing a given scene (e.g., scene of Big Ben) may be grouped together. In yet a further example, outdoor images (e.g., ones containing large amounts of blue sky) may be grouped together. In another example, images captured at a given recognized location (i.e., scene) may be grouped together. Therefore, the images may be grouped according to any one of many different content attributes they contain. Notably, in that any one image may contain attributes relevant to more than one group, images may be associated with multiple groups.

In addition, images can be grouped according to the time at which they were captured or otherwise obtained. For example, all images captured on a given date (e.g., December 25th) may be grouped for the purpose of forming an album pertinent to a given annual event. In another example, images captured in the morning, or in the evening, or during the week, or during the weekend may be grouped together. To cite a further example, images may be grouped in accordance to the frequency of image capture over a given period of time, thereby indicating an occasion on which the images were captured. In the latter case, the group may be selected by evaluating how many images are captured on each of a sequence of days. FIG. 6 provides a table 600 that illustrates such evaluation. As indicated in this figure, the number of images taken on each of days 105-114 is evaluated. In this example, a relatively large number of images were captured during days 109-110. This relatively large number of images may indicate a vacation or other occasion to which each of the images captured on those days pertain. Therefore, the images captured on days 108-110 may comprise a separate identified group of images.

In addition to the grouping described above, a combination of content and time attributes can be used to group images. For example, if an image of Big Ben is detected, and a large number of images were captured on that day and/or days immediately preceding or following that day, all such images could be grouped as potentially pertaining to a London vacation.

Through the process described above, one or more new albums may be created. Alternatively, or in addition, images may be earmarked for addition to one or more existing albums that were previously generated. For instance, if a given person were identified in a newly-downloaded image, and an album containing images of that person has already been created, that newly-downloaded image may be selected for inclusion in the already-created album. In any case, groups of images, some of which may comprise existing albums, are then presented to the user, as indicated in block 328 for the user to evaluate. Therefore, the user can browse through the groups and determine, as to each, whether to store the groups as albums. In the case in which the group comprises an existing album, this determination comprises determining whether to save the new version of the album with any new additions.

With reference to decision block 330, if none of the groups (or modified albums) is to be saved, flow for the image organization session is terminated. If, on the other hand, the user would like to save one or more groups (or new versions of albums), flow continues to block 332 and one or more new albums and/or one or more new versions of existing albums are created. Therefore, images that pertain to the group are associated with an attribute-based album by storing the locations of the images (whether original or modified) within the album folder. Optionally, the user may choose at this point to remove images from the albums, or add other images to the albums, if desired. Furthermore, the user may choose to further modify images of the albums, or select the original version over a previously modified version.

Referring back to the file structure 500 of FIG. 5, the attribute-based albums can be placed within the album folder 506. In particular, one or more attribute-based albums are provided that contain a database (e.g., comprising one or more XML files) that identifies the images associated with that album. Therefore, the database contains pointers to the images associated with the albums. For images that have not been modified, the original image from the protected originals folder 504 is identified. As for the images that have been modified, the modified images stored in the date-based albums are identified. Therefore, multiple copies of the images are not created, but the appropriate images, modified or unmodified, are shown to the user when the attribute-based album is viewed (e.g., in a slide show).

Figure 7:
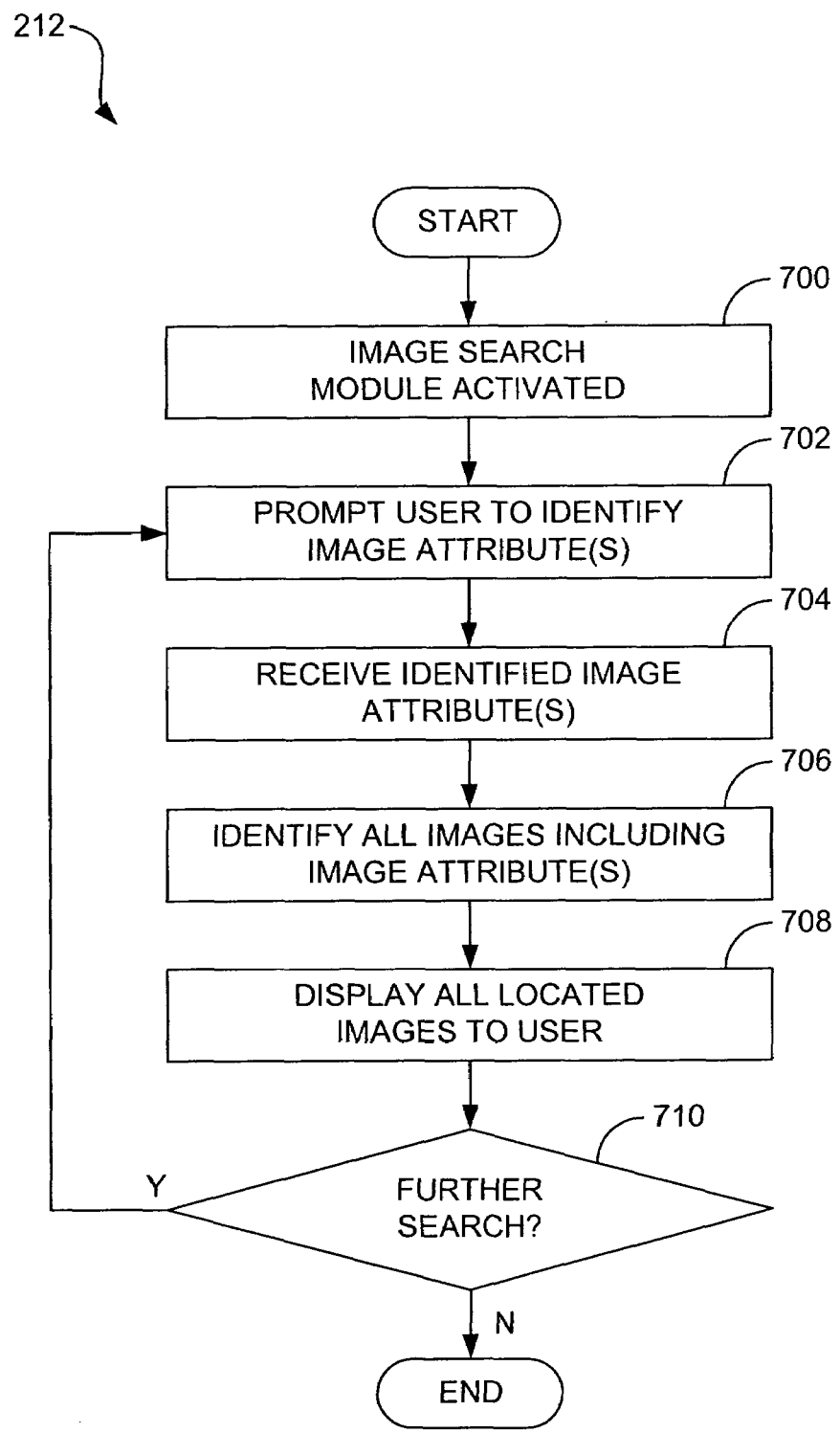
FIG. 7 is a flow diagram that illustrates an embodiment of a method for locating stored images.

FIG. 7 illustrates an example of a method for locating stored images that have been organized by the image management system 212. Beginning with block 700 of this figure, the image search module 224 is activated, for example in response to a user search request. Once the module 224 is activated, the user is prompted to identify one or more image attributes that are to be used as the search query, as indicated in block 702. These attributes can comprise content and/or time attributes. Therefore the user can, for example, identify a given person's name to locate all images containing that person's face. In another example, the user can identify all images captured on a given date (e.g., wedding anniversary) or a within a given time period (e.g., vacation). Combinations of content and time attributes may be identified also. For instance, the user may identify a given person's name and that person's birthday to locate all images of that person on his or her birthday. In any case, the identified attribute(s) is/are received, as indicated in block 704, and the search module 224 identifies all images including the identified attribute(s) or combination of attributes, as indicated in block 706. In particular, the module 224 searches through the databases associated with the original images (i.e., in the protected originals folder) to identify images that satisfy the search query. In some cases, the date searched includes days near the date identified by the user. For instance, weekend days may be searched even if the date is a weekday within a given year in that, in the case of a birthday or other celebratory day, the actual celebration may not occur on the exact day (e.g., birthday).

Once all relevant images have been identified by the image search module 224, the located images are displayed to the user, as indicated in block 708. Notably, any modified images can be automatically substituted for their associated original images, if desired, by further evaluating the contents of the date-based albums and identifying the association of any images located there with original images stored in the protected originals folder. At this point, the user can select the one or more images and manipulate them as desired (e.g., email them to a family member). In addition or exception, the user can create a new album for the located images.

Once the search results have been reviewed, it is determined whether a new search is desired, as indicated in decision block 710. If so, flow returns to block 702. If not, however, flow for the search session is terminated.

What is claimed is:

1. A method, comprising the steps of:
   receiving a first image from a user;
   analyzing content within the first image;
   detecting a feature within the first image;
   identifying a match between the detected feature and a previously-detected feature in one or more previously-stored images;
   querying the user to provide information that describes the detected feature in response to the match;
   associating the information with the first image and the one or more previously-stored images;
   identifying a group of images that comprises the first image and the one or more previously-stored images;
   presenting the group of images to the user as a photo album that comprises separate but related images.

2. The method of claim 1, wherein the step of detecting a feature comprises the step of detecting one or more faces in the first image.

3. The method of claim 1, wherein the step of detecting a feature comprises the step of detecting a scene in the first image.

4. The method of claim 1, further comprising the steps of:
   detecting dates on which the first image and the one or more previously-stored images were captured; and
   grouping the images through employment of the dates.

5. The method of claim 1, further comprising the step of:
   storing the first image within a protected originals folder.

6. A system, comprising:
   means for analyzing content within a plurality of received images;
   means for detecting a feature within the plurality of received images;
   means for querying the user to provide identification information that describes the detected feature;
   means for storing the received images and the identification information such that the identification information is associated with plurality of received images;
   means for grouping stored images that comprise the detected feature together in a group;
   means for presenting the group of images to the user as a separate photo album that comprises separate but related images that can be viewed individually in sequence; and
   means for storing the photo album.

7. The system of claim 6, wherein the means for detecting a feature comprise means for detecting faces and scenes within the received images.

8. An image management system stored on a computer-readable medium, the system comprising:
   an image analysis module that comprises logic that is configured to detect features in images received from a user and time attributes that indicate when the images were captured, to compare detected features to features that were previously identified in previously stored images in an attempt to match the detected features with features of the previously stored images, to query the user to provide identification information that describes the detected features, and to receive the identification information provided by the user;
   an image storage module that includes logic that is configured to store the received images and the user-provided identification information such that the identification information is associated with one or more of the received images; and
   an album generation module that comprises logic that is configured to group stored images that comprise like detected features together, to present groups of images to the user as separate photo albums each comprising separate but related images that can be viewed individually in sequence, and to store at least one of the photo albums.

9. The system of claim 8, wherein the logic of the image analysis module is configured to detect faces and scenes in the images and to determine dates and times of day when the images were captured.

10. The system of claim 8, further comprising an image search module that comprises logic configured to search databases of image attributes to locate particular images desired by a user.

11. A method, comprising the steps of:
receiving a plurality of images from a user;
detecting a date on which each of the plurality of images was captured;
evaluating a frequency of image capture over a period of time;
identifying from the plurality of images, a group of images that comprises images recorded during the period of time; and
presenting the group of images to the user as a photo album.

12. The method of claim 11, wherein the step of evaluating the frequency of image capture over the period of time comprises the step of:
determining a period of time in which the frequency of image capture is increased relative to adjacent periods of time.

13. The method of claim 11, further comprising the step of:
querying the user for information that describes a relation among the group of images.

* * * * *

UNITED STATES PATENT AND TRADEMARK OFFICE
CERTIFICATE OF CORRECTION

| | | |
|---|---|---|
| PATENT NO. | : 7,286,723 B2 | Page 1 of 1 |
| APPLICATION NO. | : 10/608180 | |
| DATED | : October 23, 2007 | |
| INVENTOR(S) | : Lawrence Nathaniel Taugher et al. | |

It is certified that error appears in the above-identified patent and that said Letters Patent is hereby corrected as shown below:

In column 10, line 34, in Claim 6, after "with" insert -- the --.

In columns 11-12, lines 11-16 of column 11 and lines 1-16 of column 12, delete "11. A method, comprising the steps of: receiving a plurality of images from a user; detecting a date on which each of the plurality of images was captured; evaluating a frequency of image capture over a period of time; identifying from the plurality of images, a group of images that comprises images recorded during the period of time; and presenting the group of images to the user as a photo album.
12. The method of claim 11, wherein the step of evaluating the frequency of image capture over the period of time comprises the step of: determining a period of time in which the frequency of image capture is increased relative to adjacent periods of time.
13. The method of claim 11, further comprising the step of: querying the user for information that describes a relation among the group of images.".

Signed and Sealed this

Twenty-second Day of June, 2010

David J. Kappos
*Director of the United States Patent and Trademark Office*